(12) United States Patent
Khalid (10) Patent No.: US 11,310,831 B2
(45) Date of Patent: Apr. 19, 2022

(54) WIRELESS SCHEDULE INFORMATION GENERATION AND DISTRIBUTION

(71) Applicant: CHARTER COMMUNICATIONS OPERATING, LLC, Saint Louis, MO (US)

(72) Inventor: Saran Khalid, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 80 days.

(21) Appl. No.: 16/525,479

(22) Filed: Jul. 29, 2019

(65) Prior Publication Data

US 2021/0037568 A1 Feb. 4, 2021

(51) Int. Cl.
*H04W 74/08* (2009.01)
*H04W 72/04* (2009.01)
*H04L 5/00* (2006.01)

(52) U.S. Cl.
CPC ....... *H04W 74/0816* (2013.01); *H04L 5/0007* (2013.01); *H04W 72/0446* (2013.01); *H04W 72/0466* (2013.01)

(58) Field of Classification Search
CPC ......... H04W 74/0816; H04W 72/0446; H04W 72/0466; H04L 5/0007
See application file for complete search history.

(56) References Cited

U.S. PATENT DOCUMENTS

| | | | |
|---|---|---|---|
| 2009/0279493 A1* | 11/2009 | Gaal | H04W 72/04 370/329 |
| 2019/0387578 A1* | 12/2019 | Shrestha | H04W 72/14 |

* cited by examiner

*Primary Examiner* — Brenda H Pham
(74) *Attorney, Agent, or Firm* — Armis IP Law, LLC (57) ABSTRACT

A scheduler resource maintains a grid of multiple blocks for a timeframe in which multiple wireless stations compete for use of available wireless resources to communicate in a wireless network. For a first block of the multiple blocks in the grid, the scheduler resource generates first transmit information. The scheduler resource assigns a first unique code to the transmit information, the first unique code being mapped to a first frequency band and first time slot in which the first block resides in the grid. The scheduler resource repeats this operation of assigning a unique code for each used block or block pair (and corresponding transmit information) scheduled for use by a respective wireless station. Subsequent to generation of the schedule information, the scheduler resource or other suitable entity distributes the schedule information to one or more other wireless stations in the wireless network environment.

27 Claims, 9 Drawing Sheets

| ASSIGNED UNIQUE CODE | ANTENNA | ANTENNA PORT | EIRP (dBm) | NOISE LEVEL (dBm) | CHILD SMALL CELL IDS | DISTANCE | INTERF. LEVEL | MOD. | UE LOAD | FRAME START INFO | LOAD ON CELL | MAX INTERF. THRESHOLD | ... |
|---|---|---|---|---|---|---|---|---|---|---|---|---|---|
| UC #1 | 2 | A1 | B1 | C1 | D1 | E1 | F1 | G1 | H1 | J1 | K1 | L1 | |
| N/A | | | | | | TRANSMIT INFO 551 | | | | | | | |
| N/A | | | | | | | | | | | | | |
| UC #4 | 1 | A4 | B4 | C4 | D4 | E4 | F4 | G4 | H4 | J4 | K4 | L4 | |
| N/A | | | | | | TRANSMIT INFO 554 | | | | | | | |
| N/A | | | | | | | | | | | | | |
| N/A | | | | | | | | | | | | | |

SCHEDULE INFO. 160-1

FIG. 5

| ASSIGNED UNIQUE CODE | ANTENNA | ANTENNA PORT | EIRP (dBm) | NOISE LEVEL (dBm) | CHILD SMALL CELL IDS | DISTANCE | INTERF. LEVEL | MOD. | UE LOAD | FRAME START INFO | LOAD ON CELL | MAX INTERF. THRESHOLD | ... |
|---|---|---|---|---|---|---|---|---|---|---|---|---|---|
| UC #1 | 2 | A1 | B1 | C1 | D1 | E1 | F1 | G1 | H1 | J1 | K1 | L1 | |
| UC #4 | 1 | A4 | B4 | C4 | D4 | E4 | F4 | G4 | H4 | J4 | K4 | L4 | |
| UC #10 | 2 | A10 | B10 | C10 | D10 | E10 | F10 | G10 | H10 | J10 | K10 | L10 | |
| UC #12 | 1 | A12 | B12 | C12 | D12 | E12 | F12 | G12 | H12 | J12 | K12 | L12 | |

SCHEDULE INFO. 160-2

WIRELESS SCHEDULE INFORMATION GENERATION AND DISTRIBUTION

BACKGROUND

LTE (Long Term Evolution) and its 3GPP successors have a universal frequency re-use plan. For example, the same frequency band/channel is re-used for all of the cells in a given cluster of wireless stations.

In order to improve capacity in congested areas, small cells are usually deployed. These small cells operate on the same frequency as the macro cell for a given operator. This can result in interference, especially near the small cell. This wireless interference can be controlled by a tight coordination between a macro cell and corresponding small cell over a communication link.

During operation, two cells operating in the same space will coordinate with each other to prevent transmitting in the same timeslot using the same wireless channels. For example, a macro cell base station will not schedule frequency-time resources in the area where small cell base stations are serving, or vice versa.

BRIEF DESCRIPTION OF EMBODIMENTS

There are deficiencies associated with conventional techniques of generating and distributing schedule information in which wireless stations are scheduled to transmit wireless communications. For example, conventional techniques require conveyance of substantial amounts of data between wireless stations to provide notification of scheduled usage of available wireless resources.

Embodiments herein provide improved generation of schedule information to support more efficient use of wireless resources shared by wireless stations in a wireless network.

More specifically, one embodiment herein includes a scheduler resource operable to maintain a grid of multiple blocks for a timeframe in which multiple wireless stations are scheduled to communicate in a wireless network. Use of the grid and identification of blocks in the grid using unique codes (shorthand codes) enables efficient notification of schedule information amongst wireless stations. For example, in one embodiment, the grid is a two-dimensional array of blocks; each block in the grid represents a timeslot and a set of wireless channels.

In one embodiment, a timeframe represented by the grid is partitioned (subdivided) to include multiple timeslots. The grid includes a respective set of multiple blocks for each timeslot. For example, a first timeslot of the grid includes a first block (and corresponding first set assigned wireless channels), a second block (and corresponding second set assigned wireless channels), a third block (and corresponding third set assigned wireless channels), and so on. A second timeslot of the grid includes a first block (and corresponding first set assigned wireless channels), a second block (and corresponding second set assigned wireless channels), a third block (and corresponding third set assigned wireless channels), and so on.

As previously discussed, each of the blocks in the grid is assigned a unique code. The unique code provides a shorthand way (such as using a reduced number of bits) of specifying a timeslot and a corresponding set of wireless channels (such as wireless bandwidth) associated with the respective block.

In one embodiment, the grid of blocks is a two-dimensional array of blocks. Each block in the grid is assigned a unique code as previously discussed.

Assignment of a respective block in the grid to a wireless station indicates that the wireless station is scheduled to transmit wireless communications in the respective timeslot using the corresponding set of wireless channels to which the unique code pertains.

In yet further embodiments, generation of schedule information includes producing wireless transmit information for each block scheduled for use by a wireless station. For example, in one embodiment, for each reserved block of the multiple blocks in the grid, the scheduler resource generates respective transmit information associated with a first wireless station in a wireless network environment. The transmit information indicates attributes of corresponding scheduled wireless communications associated with the first wireless station. As a more specific example, the transmit information associated with a block in the grid indicates attributes of the wireless station and/or wireless transmissions scheduled for transmission in the respective timeslot over the corresponding set of wireless channels associated with the block. Based on such information, a wireless station receiving the schedule information is able to determine what to expect for each block in the grid.

The transmit information can include any suitable information associated with scheduled wireless communications. For example, in one embodiment, the transmit information includes information such as an antenna of the wireless station that will be used to communicate respective wireless communications in the timeslot, wireless transmit power level of scheduled wireless communications in the timeslot, type of modulation of scheduled wireless communications in the timeslot, etc.

Accordingly, the transmit information associated with a respective block indicates attributes of corresponding wireless communications scheduled for transmission by a first wireless station in the first block.

In yet further embodiments, as previously discussed, the scheduler resource assigns a respective unique code to each corresponding set of transmit information. The unique code indicates a respective block (timeslot and bandwidth) to which the transmit information pertains.

Embodiments herein are useful over conventional techniques. For example, embodiments herein support a reduced and therefore efficient conveyance of schedule information amongst multiple wireless stations, enabling better use of respective wireless resources amongst multiple wireless stations.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: maintain a grid of multiple blocks for a timeframe in which multiple wireless stations are scheduled to communicate in a wireless network using available wireless resources; for a first block of the multiple blocks in the grid, generate first transmit information; and assign a first unique code to the transmit information, the first unique code mapped to a first frequency band and first time slot in which the first block resides in the grid.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing dynamic data flow prioritization that varies depending on current network conditions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

A wireless network environment includes multiple wireless stations operable to communicate with each other via shared wireless resources (wireless bandwidth). A first wireless station includes a scheduler resource that maintains a grid of multiple blocks for a timeframe in which the first wireless station schedules wireless communications in the wireless network. For a first block of the multiple blocks in the grid, the scheduler resource generates first transmit information. The scheduler resource assigns a first unique code to the transmit information, the first unique code mapped to a first frequency band and a first time slot in which the first block resides in the grid. The scheduler resource repeats the operation of assigning a unique code to each block (and corresponding transmit information) scheduled for use by a respective wireless station. Subsequent to generation of the schedule information, the scheduler resource or other suitable entity distributes the schedule information for use by other wireless stations in the wireless network environment. Via the schedule information, the receiving wireless stations identify which blocks in the grid are used by another wireless station and which are blocks in the grid are available for use.

Figure 1:
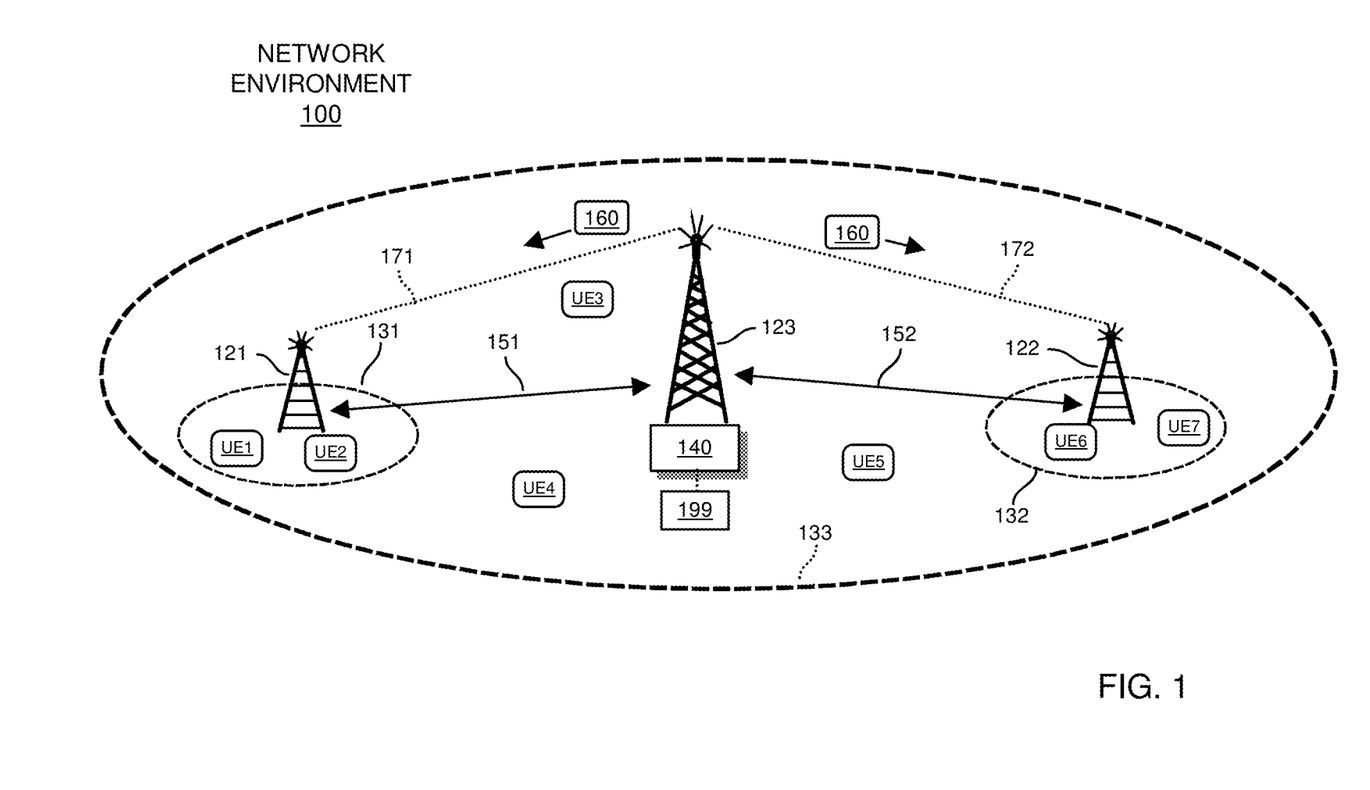
FIG. 1 is an example diagram illustrating generation and distribution of schedule information in a wireless network environment according to embodiments herein.

Now, with reference to the drawings, FIG. 1 is an example diagram illustrating generation and distribution of schedule information in a wireless network environment to coordinate shared use of resources according to embodiments herein.

As shown, wireless network environment 100 includes multiple wireless stations including wireless station 121, 122, 123, etc. Each of the wireless station provides respective mobile communication devices wireless connectivity to a remote network such as the Internet.

In one embodiment, wireless station 121 (such as a small cell base station) provides a region of wireless coverage 131 in which one or more mobile communication devices (such as UE1, UE2, etc.) reside. Wireless station 121 is in wireless communication with each of the mobile communication devices UE1 (user equipment #1), UE2 (user equipment #2), etc., and provides respective mobile communication devices access to a remote network.

Wireless station 122 provides a region of wireless coverage 132 in which one or more mobile communication devices (such as UE6, UE7, etc.) reside. Wireless station 122 is in wireless communication with each of the mobile communication devices UE6, UE7, etc., and provides respective mobile communication devices access to a remote network such as the Internet.

Wireless station 123 provides a region of wireless coverage 133 in which one or more mobile communication devices (such as UE3, UE4, UE5, etc.) reside. Wireless station 123 is in wireless communication with each of the mobile communication devices UE6, UE7, etc., and provides respective mobile communication devices access to a remote network such as the Internet.

Note that each of the mobile communication devices in a respective small cell wireless coverage can connect to a respective small cell or large cell. For example, mobile communication devices UE1, UE2, etc., can access a remote network via wireless connectivity provided by wireless station 121 or wireless station 123; mobile communication devices UE6, UE7, etc., can access a remote network via wireless connectivity provided by wireless station 122 or wireless station 123. Since mobile communication devices UE3, UE4, and UE5 do not reside within a respective small cell coverage, such devices must wirelessly connect with the wireless station 123 to access the remote network such as the Internet.

In one embodiment, it is desirable that a respective mobile communication device connection with a respective small cell (such as wireless station 121, 122, etc.) if possible, rather than wirelessly connect with the large cell (such as wireless station 123). Accordingly, mobile communication device UE1 and mobile communication device UE2 are in wireless communication with wireless station 121; mobile communication device UE6 and mobile communication device UE7 are in wireless communication with wireless station 122; mobile communication devices UE3, UE4, and UE5 are in wireless communication with wireless station 123; etc.

Further note that each of the wireless stations share use of the same wireless channels to support wireless communications with respective mobile communication devices. Thus, conveyance of wireless communications in the network environment 100 are susceptible to interference.

As previously discussed, embodiments herein provide improved generation of schedule information 160 to support more efficient use of wireless resources in a shared wireless network (wireless network environment 100) in which wireless stations such as wireless station 121, 122, and 123 compete for use of available wireless resources.

For example, in one embodiment, scheduler resource 140 maintains a grid 199 of multiple blocks to keep track of bandwidth information and timeslots scheduled for use by the wireless station 123.

As further discussed herein, based on the grid 199, the scheduler resource 140 produces schedule information 160 that is distributed to respective nearby wireless stations 121 and 122.

Note that the schedule information 160 can be distributed in any suitable manner. For example, network environment 100 includes hardware communication links 151 and 152 (such as cables, fibers, etc.) over which the wireless station 123 (and scheduler resource 140) communicates the schedule information 160 to each of the wireless stations 121 and 122.

Additionally, or alternatively, network environment 100 also support wireless communication links 171 and 172 between wireless stations. In one embodiment, the scheduler resource 140 and/or wireless station 123 wirelessly communicate the schedule information 160 over wireless communication links 171 and 172 to the wireless stations 121 and 122.

Note that each of the wireless stations can be configured to operate in a similar manner in which wireless station 123 generates and distributes schedule information 160. For example, wireless station 121 can be configured to generate schedule information 121 indicating planned scheduling of communications in the region of wireless coverage 131. The wireless station 121 communicates the generated schedule information to the wireless station 123 and/or wireless station 122.

Figure 2:
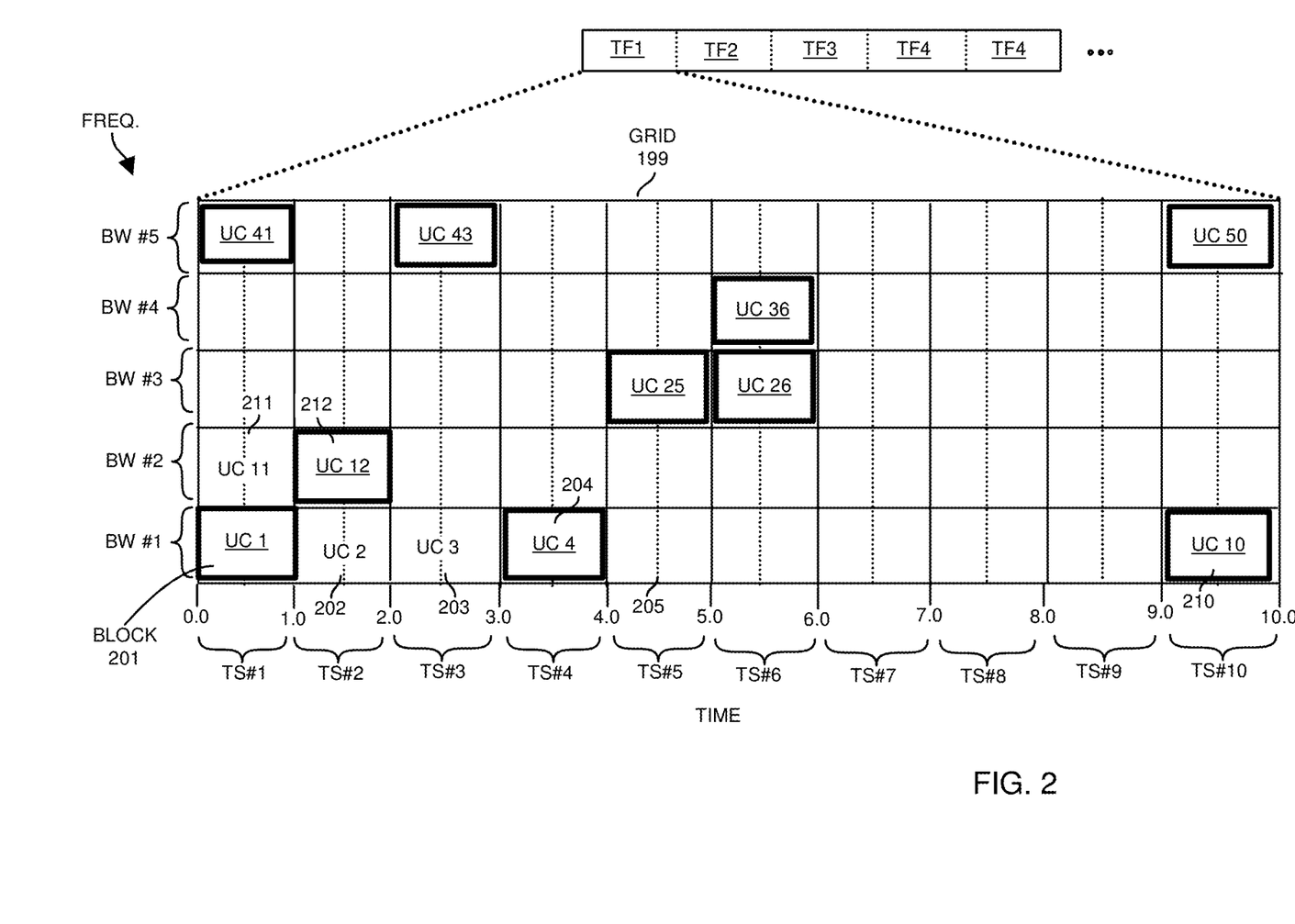
FIG. 2 is an example diagram illustrating use of a grid including multiple blocks to generate schedule information according to embodiments herein.

FIG. 2 is an example diagram illustrating generation of a grid including multiple blocks from which schedule information is generated according to embodiments herein.

In one embodiment, each full frame (such as multiple timeframes TF1 to TF10) is 10 mS (milliseconds) in duration. Each timeframe (such as TF1, TF2, etc.) includes 100 resource blocks, supporting 20 MHz of bandwidth. In one embodiment, each resource block is transmitted over a 0.5 mS of a respective time slot. Two resource blocks represent a single block (such as a resource block pair) during a 1 mS subframe.

Figure 4:
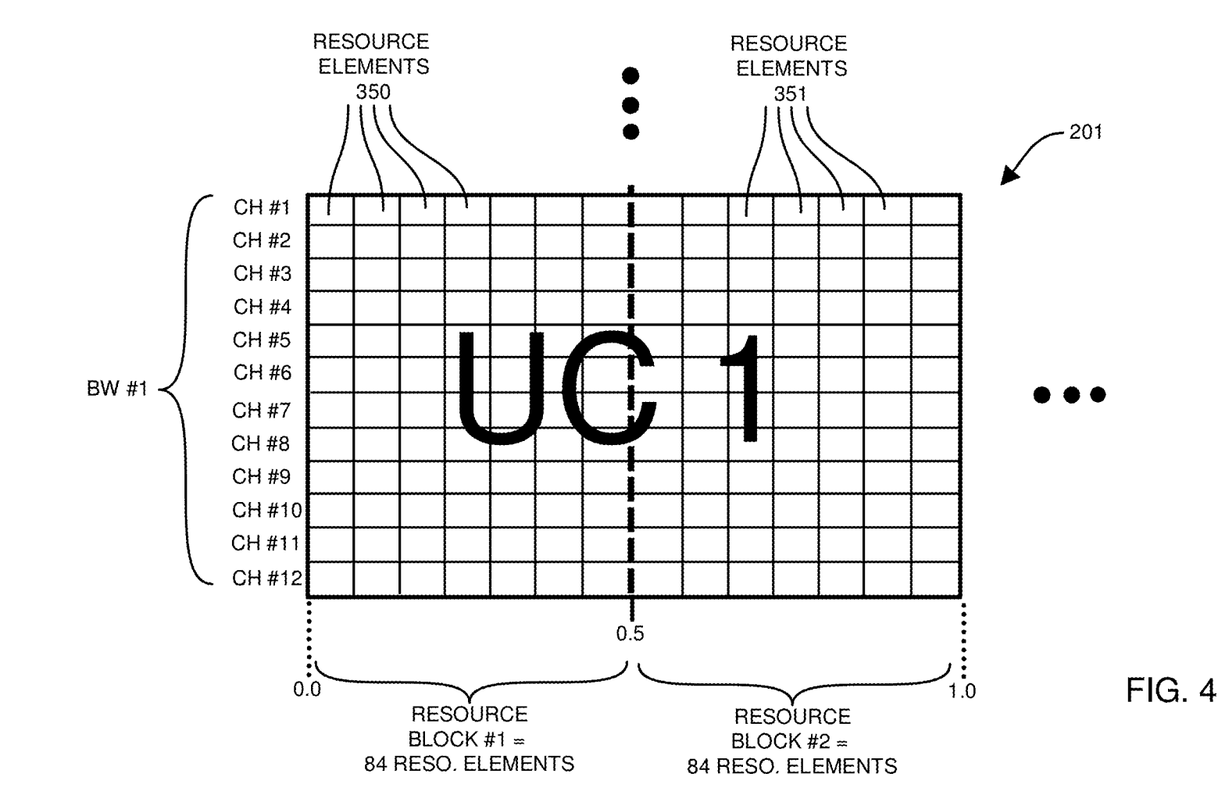
FIG. 4 is an example diagram illustrating assignment of a unique code to a timeslot of multiple resource blocks according to embodiments herein.

As further discussed in FIG. 4, each resource block is made up of twelve carrier frequencies, each supporting a bandwidth of 15 KHz, each carrying 7 OFDM symbols over a respective duration of 0.5 mS. This means each resource block is 15×12=180 KHz wide in frequency and is composed of 12×7=84 resource elements. Each resource element supports transmission of a single symbol (schedule of 84 symbols).

These resource blocks are transmitted to and from the enodeB in pairs. These pairs are assigned numbers (unique codes) from a value of 1-50 as shown in the grid 199 of one timeframe TF1.

Instead of transmitting the entire resource element grid 199, which would mean 84×100=8,400 entries in a table, embodiments herein include producing a reduced data set of schedule information 160, which includes schedule information for 50 blocks of grid 199, which corresponds to 50 resource pairs during a respective timeframe.

The 50 entries (identified by unique codes 1-50) in the grid 199 corresponds to 50 resource blocks for 20 MHz of bandwidth.

A respective wireless station 121 receiving schedule information 160 derived from the grid 199 for a respective timeframe uses the received schedule information 160 to determine which blocks are free for use. In one embodiment, the receiving wireless station 121 either uses the free (block) resources to communicate downstream to the respective mobile communication devices or schedules available free resources for use by the respective mobile communication devices to communicate with the respective wireless station.

In one embodiment, the wireless station 121 receiving the schedule information 160 uses the schedule information 160 to determine an appropriate power level, timeslot, etc., at which the receiving wireless station or corresponding mobile communication devices are able to transmit without causing undue interference to other wireless stations in the network environment 100.

Referring again to FIG. 2, the scheduler resource 140 maintains a grid 199 of multiple blocks (such as 50 timeslot/frequency blocks) for a respective timeframe in which multiple wireless stations are scheduled to communicate in wireless network environment 100. Use of the grid 199 and identification of respective blocks in the grid 199 using unique codes (1-50) enables efficient notification of schedule information 160 amongst the wireless stations.

More specifically, in one embodiment, the grid 199 as shown in FIG. 2 is a two-dimensional array of blocks; each block in the grid 199 represents a timeslot and a set of wireless channels in which wireless communications are scheduled.

In accordance with further embodiments, a timeframe such as TF1 represented by the grid 199 is partitioned (subdivided) to include multiple timeslots (namely, TS #1, TS #2, TS #3, TS #4, TS #5, TS #6, TS #7, TS #8, TS #9, and TS #10. Each of the timeframes timeframe TF2, timeframe TF3, timeframe TF4, etc., is partitioned into timeslot in a similar manner.

Thus, the grid 199 includes a respective set of multiple blocks for each timeslot. For example, a first timeslot (TS #1) of the grid 199 includes a first block UC1 (and corresponding bandwidth BW1 such as a first set of assigned wireless channels 1-12), a second block UC11 (and corresponding bandwidth BW2 such as a second set of assigned wireless channels 13-24), a third block UC21 (and corresponding bandwidth BW3 such as a third set of assigned wireless channels 25-36), a fourth block UC31 (and corresponding bandwidth BW4 such as a fourth set of assigned wireless channels 37-48), a fifth block U41 (and corresponding bandwidth BW5 such as a fifth set of assigned wireless channels 49-60).

Additionally, a second timeslot (TS #2) of the grid 199 includes a first block UC2 (and corresponding first set of assigned wireless channels 1-12), a second block UC12 (and corresponding second set of assigned wireless channels 13-24), a third block UC22 (and corresponding third set of assigned wireless channels 25-36), a fourth block UC32 (and corresponding fourth set of assigned wireless channels 37-48), a fifth block U42 (and corresponding fifth set of assigned wireless channels 49-60).

In a similar manner, each of the timeslots in the grid 199 has an associated set of blocks, each assigned a respective unique code.

As previously discussed, each of the blocks in the grid 199 is assigned a unique code. The unique code provides a shorthand way (such as using a reduced number of bits) of specifying a timeslot and corresponding set of wireless channels (such as wireless bandwidth) associated with the respective block in the grid 199.

As previously discussed, assignment of a respective block in the grid 199 to a respective wireless station indicates that the wireless station is scheduled to transmit wireless communications in the respective timeslot using the corresponding set of wireless channels to which the unique code pertains.

For example, assume in this example embodiment that the scheduler resource 140 schedules wireless communications associated with the wireless station 123 and corresponding region of wireless coverage 133 using the grid 199 in FIG. 2. More specifically, as indicated by the grid 199, assume that the scheduler resource 140 schedules blocks assigned unique codes UC1, UC4, UC10, UC12, UC25, UC26, UC36, UC41, UC43, and UC50 for use by the wireless station 123 and/or the corresponding mobile communication devices UE3, UE4, UE5, etc.

In one embodiment, the scheduler resource 140 populates an instance of the schedule information 160 to indicate unique codes UC1, UC4, UC10, UC12, UC25, UC26, UC36, UC41, UC43, and UC50 for the timeframe TF1. This indicates the blocks scheduled for use by the wireless station 123. Based on knowing there are 50 unique codes, the wireless station 121 or 122 receiving the schedule information 160 identifies which blocks are free for use by that wireless station. In this example embodiment, the receiving wireless station 121 identifies from the schedule information 160 (as derived from grid 199) that blocks UC2, UC3, UC5, UC6, UC7, UC8, UC9, UC11, UC13, etc., are free for use.

Figure 3:
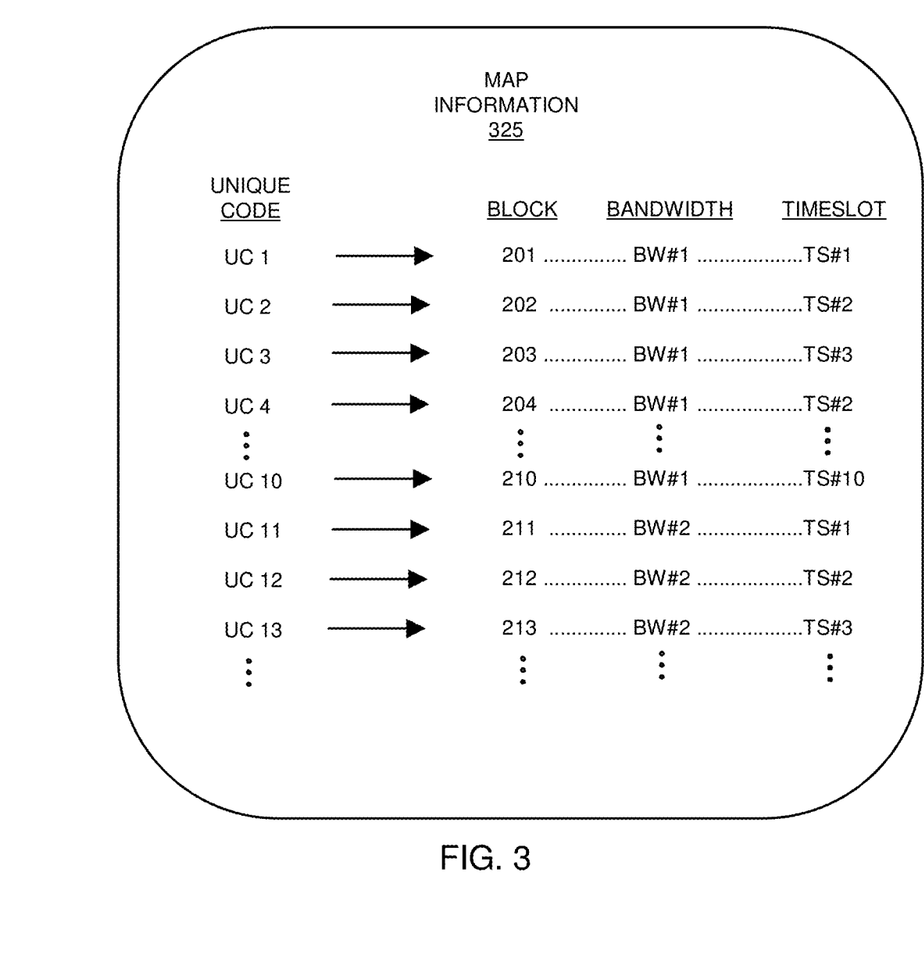
FIG. 3 is an example diagram illustrating a mapping of unique codes to corresponding blocks in a grid according to embodiments herein.

FIG. 3 is an example diagram illustrating a mapping of unique codes to corresponding blocks in a grid according to embodiments herein.

In one embodiment, the scheduler resource 140 or other suitable entity generates the map information 325. As its name suggests, the map information 325 provides a mapping between a respective unique code and corresponding block (assigned predetermined bandwidth and timeslot) in the grid 199.

More specifically, in this example embodiment, unique code UC1 of map information 325 maps to block 201 of grid 199, which is assigned bandwidth BW #1 (wireless channels 1-12 and timeslot TS #1); unique code UC2 maps to block 202 of grid 199, which is assigned bandwidth BW #1 (wireless channels 1-12) and timeslot TS #2; unique code UC3 of map information 325 maps to block 203, which is assigned bandwidth BW #1 (wireless channels 1-12) and timeslot TS #3; unique code UC4 of map information 325 maps to block 204, which is assigned bandwidth BW #1 (wireless channels 1-12) and timeslot TS #4; unique code UC5 of map information 325 maps to block 205, which is assigned bandwidth BW #1 (wireless channels 1-12) and timeslot TS #5; unique code UC6 of map information 325 maps to block 206, which is assigned bandwidth BW #1 (wireless channels 1-12) and timeslot TS #6; and so on.

Further in this example embodiment, unique code UC11 of map information 325 maps to block 211, which is assigned bandwidth BW #2 (wireless channels 13-24) and timeslot TS #1; unique code UC12 maps to block 212, which is assigned bandwidth BW #2 (wireless channels 13-24) and timeslot TS #2; unique code UC13 of map information 325 maps to block 213, which is assigned bandwidth BW #2 (wireless channels 13-24) and timeslot TS #3; unique code UC14 of map information 325 maps to block 214, which is assigned bandwidth BW #2 (wireless channels 13-24) and timeslot TS #4; unique code UC15 of map information 325 maps to block 215, which is assigned bandwidth BW #2 (wireless channels 13-24) and timeslot TS #5; unique code UC6 of map information 325 maps to block 216, which is assigned bandwidth BW #2 (wireless channels 13-24) and timeslot TS #6; and so on.

Accordingly, via map information 325, each of the unique codes maps to a respective block in grid 199.

In one embodiment, there are 50 blocks per (scheduling) grid 199 and therefore 50 unique codes per timeframe. By way of non-limiting example embodiment, multiple bits (such as 6 bits) are used to indicate each of the 50 unique codes. Unique code UC1 is assigned binary value 000001; unique code UC2 is assigned binary value 000010; unique code UC3 is assigned binary 000011; unique code UC4 is assigned binary value 000100; and so on.

FIG. 4 is an example diagram illustrating assignment of a unique code to a block and resources associated with each block according to embodiments herein.

In this example embodiment, block 201 of grid 199 is assigned unique code UC1 and includes a resource block pair. Resource block #1 includes 84 resource elements 350 (between time 0.0 and 0.5 mS); resource block #2 includes 84 resource elements 351 (between time 0.5 and 1.0 mS).

Each resource element enables transmission of one symbol in a respective channel. Thus, block 201 (pair of resource blocks of 1 mS duration and 12 channels) supports conveyance of 168 symbols between a first wireless station and a second wireless station.

Figure 5:
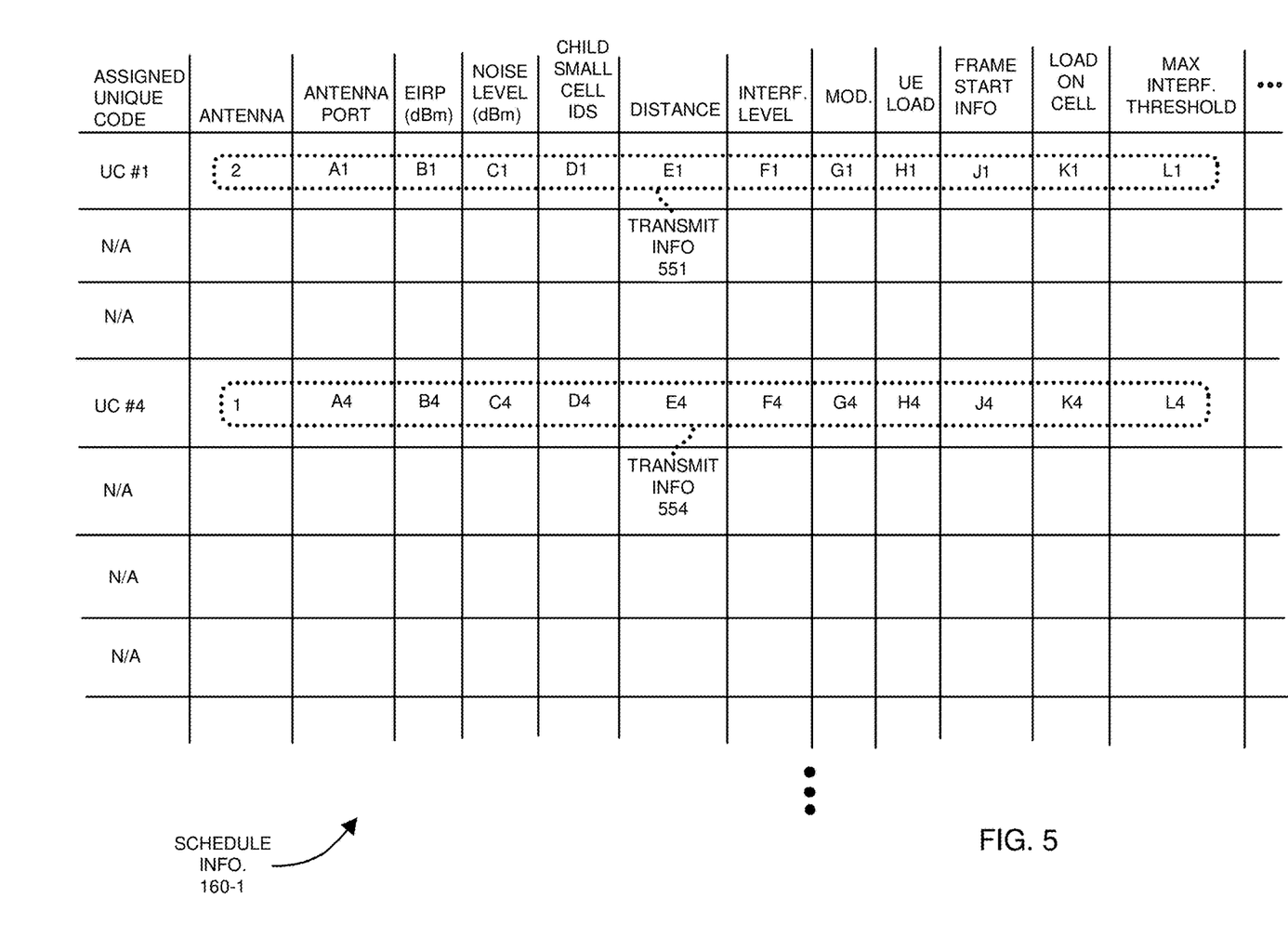
FIG. 5 is an example diagram illustrating generation of schedule information and assignment of a unique code to transmit information according to embodiments herein.

FIG. 5 is an example diagram illustrating generation of schedule information and assignment of a unique code according to embodiments herein.

In yet further embodiments as shown in FIG. 5, generation of schedule information 160-1 includes producing respective wireless transmit information for each block scheduled for use by a wireless station.

For example, in one embodiment, for each reserved block of the multiple blocks in the grid 199, the scheduler resource 140 generates respective transmit information associated with a first wireless station 123 in wireless network environment 100 and corresponding scheduled communications. The transmit information indicates attributes of the corresponding scheduled wireless communications.

As a more specific example, the transmit information 551 associated with a block 201 (assigned unique code UC1) in the grid 199 indicates attributes of the wireless station 123 and/or wireless transmissions scheduled for transmission in the respective timeslot TS1 over the corresponding set of wireless channels 1-12 associated with the block 201.

Note that the transmit information 551 can include information associated with scheduled wireless communications such as: an antenna of the wireless station 123 that will be used to communicate respective wireless communications in the timeslot, antenna port, EIRP (Effective Isotropic Radiated Power) such as wireless transmit power level of scheduled wireless communications in the timeslot, noise level in the region, child small cell identifier, distance information, interference level, type of modulation of scheduled wireless communications in the timeslot, user equipment load, frame start information, load on cell, maximum interference threshold, etc.

In this example embodiment, the scheduler resource 140 generates transmit information 551 to include settings data 2, A1, B1, C1, D1, E1, F1, G1, H1, J1, K1, L1, etc., associated the block 201 assigned unique code UC1. The settings data (transmit information 551) indicates respective settings or information associated with the corresponding wireless communications.

Via the transmit information 551, the wireless station 121 or 122 analyzing the respective schedule information 160-1 is able to identify usage of resources by the wireless station 123 and make appropriate decisions regarding use of available resources not used by the wireless station 123.

In this example embodiment, the scheduler resource 140 generates transmit information 552 to include settings data 1, A4, B4, C4, D4, E4, F4, G4, H4, J4, K4, L4, etc., associated the block 204 assigned unique code UC4. The settings data indicates respective settings associated with the corresponding wireless communications in block 204 scheduled for use by the wireless station 123. Via the transmit information 552, the wireless station 121 or 122 analyzing schedule information 160-1 is able to identify usage of resources (unused blocks) by the wireless station 123 and make appropriate decisions regarding use of available resources not used by the wireless station 123.

In a manner as previously discussed, the scheduler resource 140 assigns a respective unique code UC1 to transmit information 551; the scheduler resource 140 assigns a respective unique code UC4 to transmit information 552; and so on. Further, as previously discussed, the assigned unique code indicates a corresponding block to which the corresponding set of transmit information pertains.

Embodiments herein are useful over conventional techniques. For example, embodiments herein support a reduced schedule information data set and, therefore, efficient conveyance of schedule information amongst multiple wireless stations, enabling better use of respective wireless resources.

Figure 6:
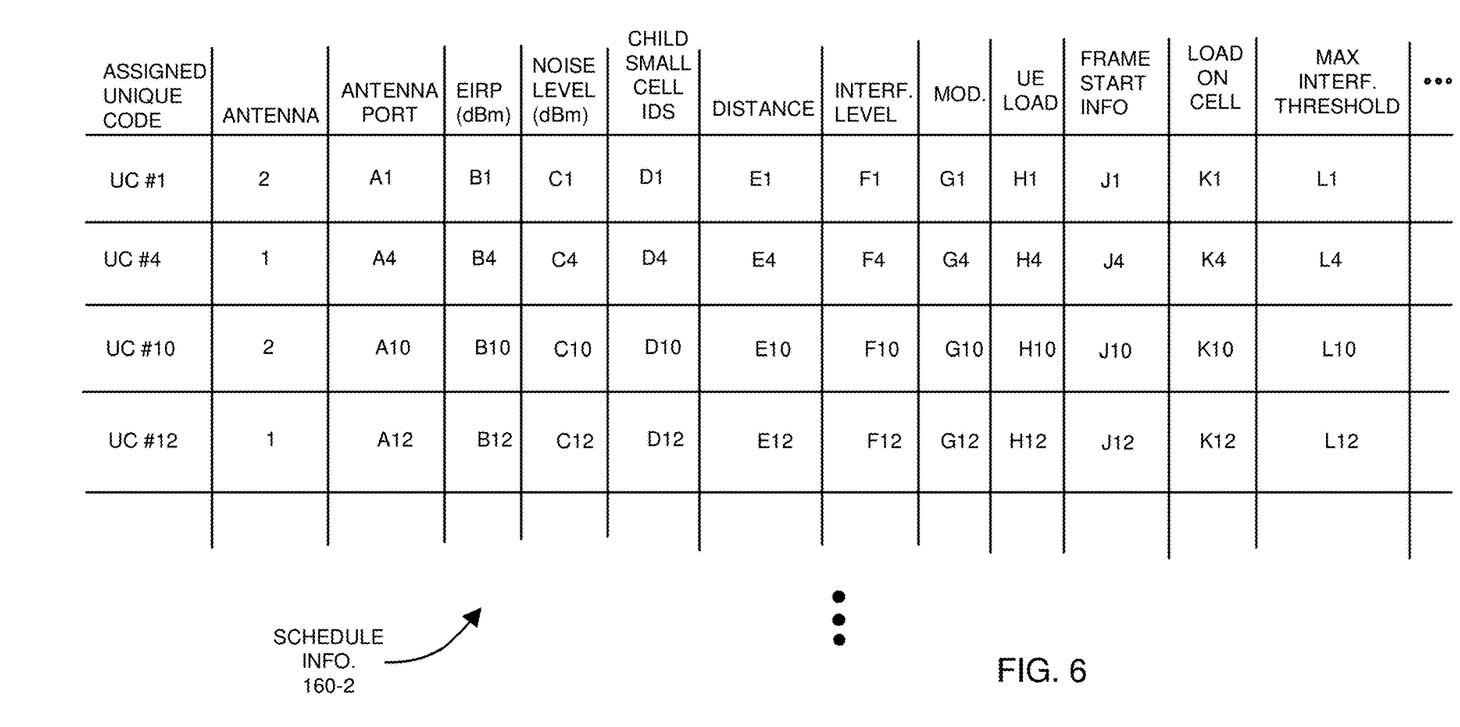
FIG. 6 is an example diagram illustrating generation of schedule information and assignment of a unique code to transmit information according to embodiments herein.

FIG. 6 is an example diagram illustrating generation of schedule information and assignment of a unique code according to embodiments herein.

In this example embodiment, the scheduler resource 140 populates an instance of the schedule information 160-2 to include only transmit information and corresponding unique codes for resource blocks used by the wireless station 123 rather than also include schedule information associated with blocks of the grid in which the wireless station does not schedule any wireless communications.

In such an embodiment, the schedule information 160-2 includes a respective row of transmit information associated with unique codes UC1, UC4, UC10, UC12, UC25, UC26, UC36, UC41, UC43, and UC50. The schedule information 160-2 excludes rows of transmit information for unique code UC2, UC3, UC5, UC6, UC7, UC8, UC9, UC11, UC13, etc., eliminating the transmission of extra unneeded data bits.

Figure 7:
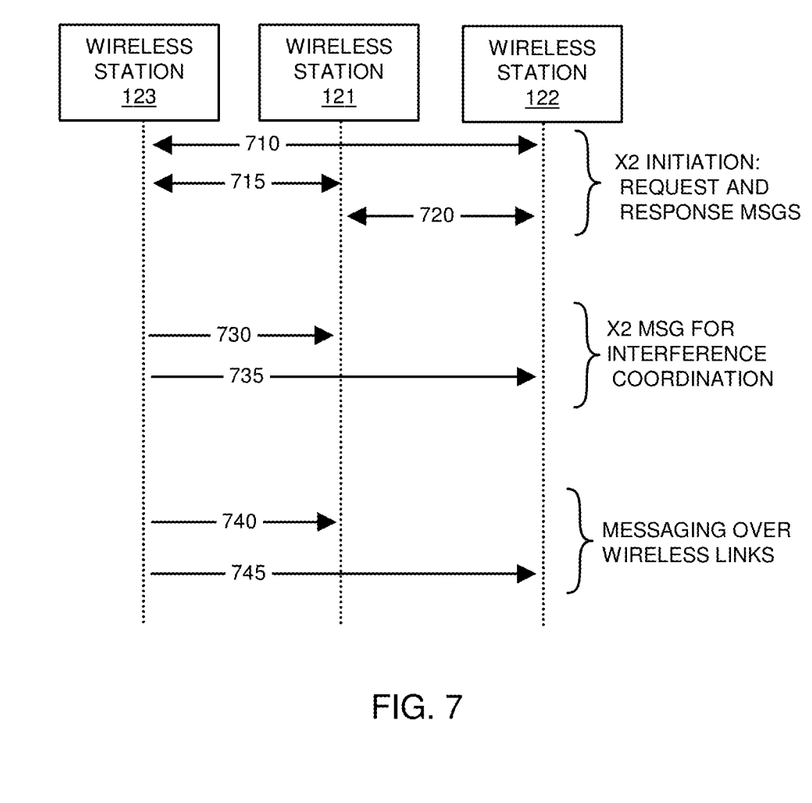
FIG. 7 is an example diagram illustrating different techniques of distributing schedule information according to embodiments herein.

FIG. 7 is an example diagram illustrating different techniques of distributing schedule information according to embodiments herein.

In a first example embodiment, via communications 710, 715, and 720 over respective hardwired communication links 151 and 152 (such as X2), the wireless stations generate request and response messages, during which schedule information 160 is distributed amongst each other. As previously discussed, each of the wireless stations can be configured to generate respective schedule information indicating in which blocks the corresponding wireless station plans to wirelessly communicate in a network environment.

In a second example embodiment, via communications 730 and 735 over respective hardwired communication links 151 and 152 (such as X2), the wireless station 123 distributes schedule information 160 to each of the respective wireless stations 121 and 122.

In a third example embodiment, via communications 740 and 745 over respective wireless communication links 171 and 172 (such as UU), the wireless station 123 distributes schedule information 160 to each of the respective wireless stations 121 and 122.

In one example embodiment, the small cells (such as wireless station 121 and 122) identify presence of the wireless station 123 (macro cell) and other relay nodes using automatic neighbor relations, PCID (Physical Layer Cell Identifier, PRACH (Physical Random Access Channel), and tracking area code etc.

In accordance with further embodiments, the network classifies small cells and macro cells based on their transmit powers, location, PCID, height of antenna from the ground, etc. Measurement control in a respective enodeB associated with a respective wireless station triggers a message from wireless station 123 (large cell) to wireless stations 121 and 122 (small cells) based on some thresholds pre-defined in the network.

In accordance with further embodiments, the large cell wireless station 123 transmits at a higher wireless power level than each of the small cell wireless stations 121 and 122. In such an instance, the message from the scheduler resource 140 will only be one directional as shown in the message flow of FIG. 7 to reduce back and forth communications over the X2 wireless communication link, reducing an amount of time it takes to communicate respective schedule information 160 to the wireless stations 121 and 122.

In yet further embodiments, the scheduler resource 140 has access to configuration information indicating which of one or more wireless stations reside within its region of wireless coverage. As previously discussed, in this case, both wireless stations 121 and 122 reside within the region of wireless coverage 133 provided by wireless station 133.

Small cells will transmit on resource blocks to UEs within the footprint of the small cell by maximizing the distance from the UE that is being transmitted to by the macro to its connected UE on the same resource block. This information is transmitted over X2 by the macro cell to small cells as shown in the table.

As previously discussed, each block in the grid 199 is assigned a unique number (unique code). The receiving wireless stations 121 and 122 use the unique code information and corresponding transmit information in the schedule information 160 to determine in which blocks of the grid 199 there are no wireless communications scheduled for transmission by the wireless station 123.

In one embodiment, the small cell wireless stations 121 and 122 use the received schedule information 160 to develop a grid map for frequency-time grid showing a heatmap for resource blocks. The lowest-heat units in the developed grid map derived from the schedule information 160 are the best resources in which to transmit wireless communications from the small cell wireless station.

Small cell wireless stations 121 and 122 schedule UEs for transmission to minimize the overall noise. This is accomplished by minimizing the power needed to transmit on a given resource block.

In yet further embodiments, a maximum interference threshold defined can be extracted from a database for a given noise, distance level, and if the threshold is reached, the respective small cell wireless station will not transmit wireless communications for that particular block in the grid 199.

Assume in this example embodiment that the wireless stations 121 and 122 each receive schedule information 160.

In such an instance, the wireless stations 121 and 122 are aware that the wireless station 123 has scheduled transmissions for respective rows of transmit information associated with unique codes UC1, UC4, UC10, UC12, UC25, UC26, UC36, UC41, UC43, and UC50.

Using map information 325 in FIG. 3, the wireless stations 121 and 122 learn that they are free to use blocks (frequencies and timeslots) in grid schedule information 160-2 for unique codes UC2, UC3, UC5, UC6, UC7, UC8, UC9, UC11, UC13, etc.

During timeframe TF1, because the wireless station 121 identifies non-use of blocks in the grid 199 identified by the unique codes UC2, UC3, UC5, UC6, UC7, UC8, UC9, UC11, UC13, etc., the wireless station 121 allocates timeslot-frequency resources associated with unique codes UC6, UC7, UC8, and UC9 to mobile communication device UE1 in the uplink direction from the mobile communication device UE1 to the wireless station 121; the wireless station 122 allocates timeslot-frequency resources associated with unique codes UC13, UC14, UC15, UC16, and UC17 to mobile communication device UE2 to transmit in the uplink direction from the mobile communication device UE2 to the wireless station 121, and so on.

In one embodiment, the wireless station 121 generates respective schedule information that is communicated to the wireless station 123. Such schedule information generated by the wireless station 121 notifies the wireless station 123 which blocks of grid 199 that the wireless station 121 has assigned for use by itself or corresponding mobile communication devices in the region of wireless coverage 131. Accordingly, embodiments herein include generation of schedule information at each of multiple wireless stations.

Figure 8:
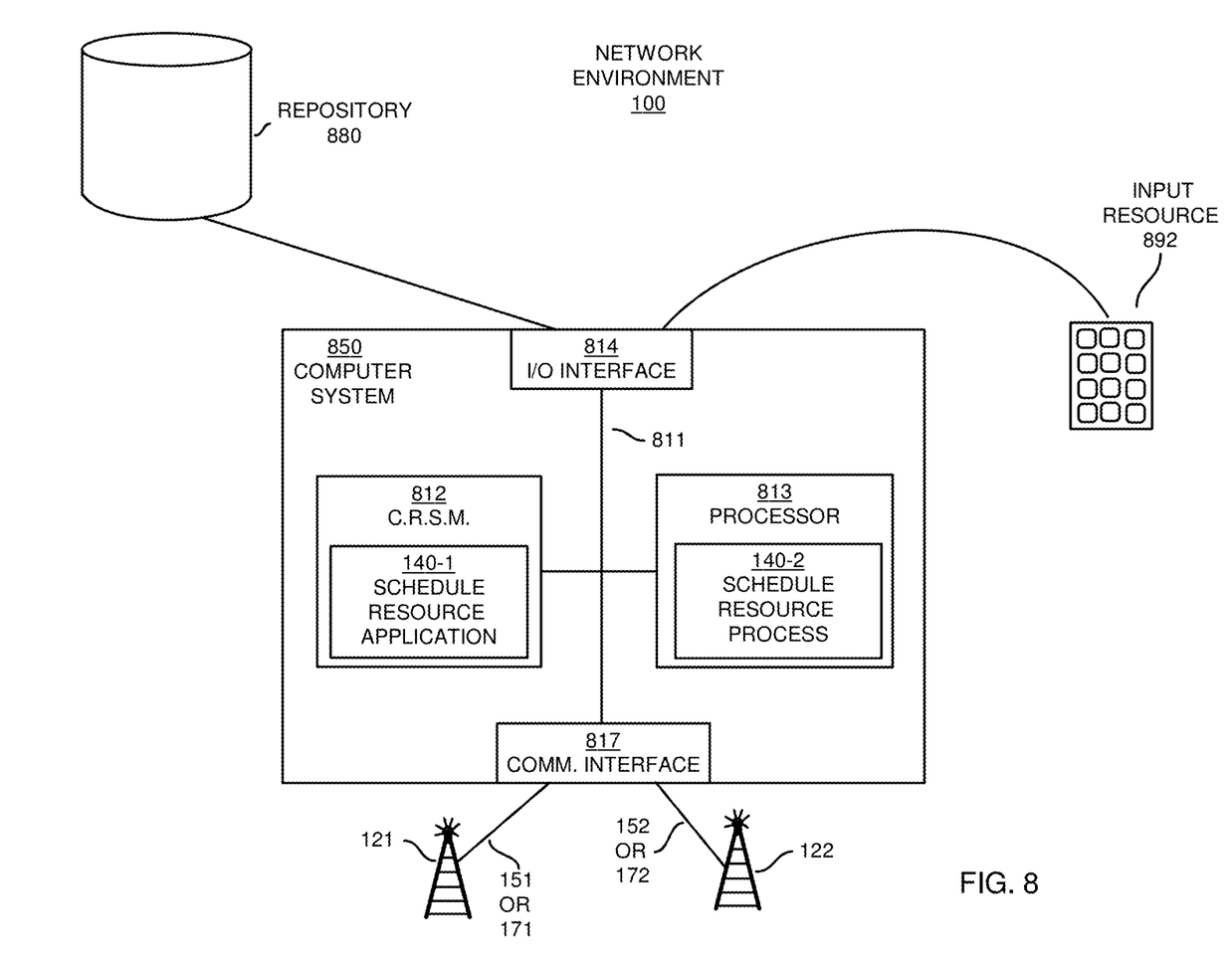
FIG. 8 is an example diagram illustrating example computer hardware and software operable to execute operations according to embodiments herein.

FIG. 8 is an example block diagram of a computer system for implementing any of the operations as previously discussed according to embodiments herein.

Any of the resources (such as scheduler resource 140, wireless station 121, wireless station 122, wireless station 123, etc.) as discussed herein can be configured to include computer processor hardware and/or corresponding executable instructions to carry out the different operations as discussed herein.

As shown, computer system 850 of the present example includes interconnect 811 coupling computer readable storage media 812 such as a non-transitory type of media (which can be any suitable type of hardware storage medium in which digital information can be stored and or retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with scheduler resource application 140-1 (e.g., including instructions) in a respective wireless station to carry out any of the operations as discussed herein.

During operation of one embodiment, processor 813 accesses computer readable storage media 812 via the use of interconnect 811 in order to launch, run, execute, interpret or otherwise perform the instructions in scheduler resource application 140-1 stored on computer readable storage medium 812. Execution of the scheduler resource application 140-1 produces scheduler resource process 140-2 to carry out any of the operations and/or processes as discussed herein.

Those skilled in the art will understand that the computer system 850 can include other processes and/or software and hardware components, such as an operating system that controls allocation and use of hardware resources to execute scheduler resource application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 9. Note that the steps in the flowcharts below can be executed in any suitable order.

Figure 9:
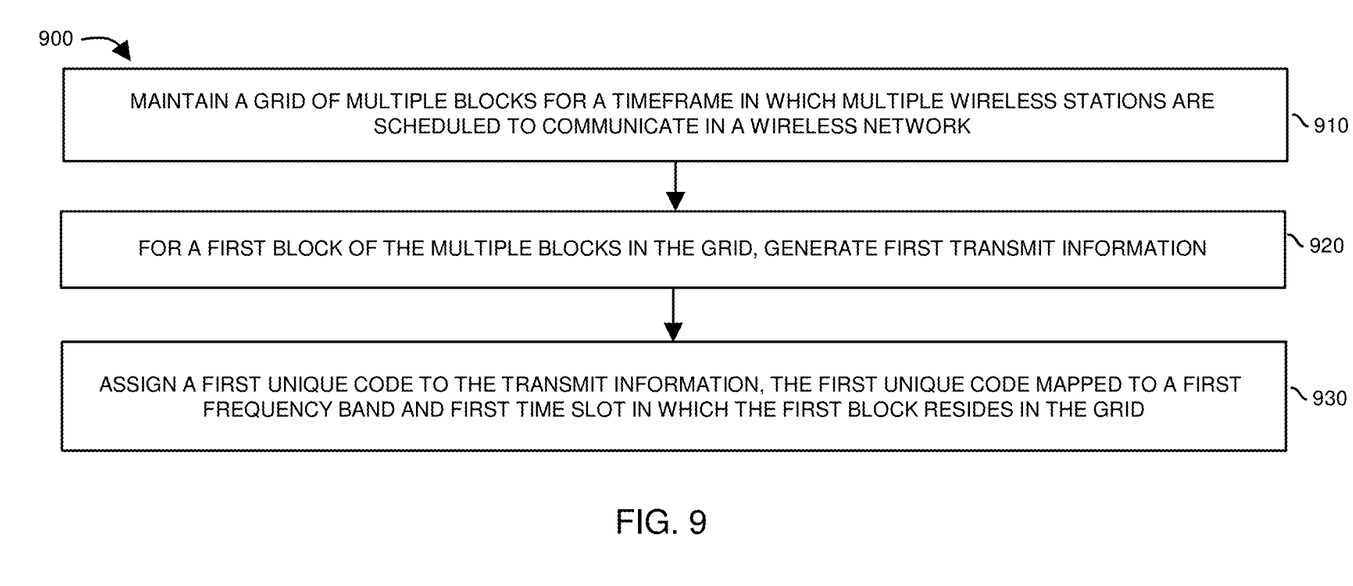
FIG. 9 is an example diagram illustrating a method according to embodiments herein.

FIG. 9 is a flowchart 900 illustrating an example method according to embodiments herein. Note that there will be some overlap with respect to concepts as discussed above.

In processing operation 910, the scheduler resource 140 associated with wireless station 123 maintains a grid 199 of multiple blocks for a timeframe TF1 in which multiple wireless stations (121, 122, 123, etc.) are scheduled to communicate in wireless network 100.

In processing operation 920, for a first block of the multiple blocks in the grid 199, the scheduler resource 140 generates first transmit information 451.

In processing operation 930, the scheduler resource 140 assigns a first unique code (such as UC1) to the transmit information 451, the first unique code UC1 is mapped to a first frequency band (such as bandwidth BW #1 including channels 1, 2, 3, 4, 5, 6, 7, 8, 9, 10, 11, and 12) and first time slot (between time 0.0 and 1.0) in which the first block 201 (such as first resource block pair) resides in the grid 199.

Note again that techniques herein are well suited to facilitate shared use of wireless resources in a network environment amongst different wireless stations. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   maintaining a grid of multiple blocks for a timeframe in which a first wireless station schedules wireless communications in a wireless network, a first block of the grid assigned a first unique code;
   for the first block of the multiple blocks in the grid, generating first transmit information;
   assigning the first unique code to the first transmit information, the first unique code indicating a first frequency band and a first time slot in which the first block resides in the grid; and
   producing schedule information to include: i) the first unique code and the first transmit information, the first transmit information indicating first wireless transmitter settings of the first wireless station, and ii) a second unique code and second transmit information, the second transmit information indicating second wireless transmitter settings of the first wireless station, the schedule information indicating scheduled transmission of future wireless communications from the first wireless station.

2. The method as in claim 1, wherein the first frequency band is one of multiple frequency bands available during the first time slot of the timeframe.

3. The method as in claim 1, wherein the first frequency band includes multiple wireless channels assigned to the first block.

4. The method as in claim 1, wherein the first transmit information indicates attributes of corresponding wireless communications scheduled for transmission by the first wireless station using resources associated with the first block.

5. The method as in claim 1 further comprising:
   maintaining the grid to include a first set of multiple blocks for the first time slot, each of the multiple blocks in the first set supporting communications in a different frequency band; and
   assigning a different unique code to each of the multiple blocks in the first set.

6. The method as in claim 5 further comprising:
producing the grid to be a two-dimensional array including multiple time slots that reside within the timeframe, each timeslot including a respective set of blocks, each corresponding block in the respective set allocated multiple wireless channels in which to transmit wireless communications.

7. The method as in claim 1 further comprising:
communicating the schedule information to a second wireless station in the wireless network, the schedule information indicating scheduling of transmission by the first wireless station in the timeframe.

8. The method as in claim 7, wherein the second wireless station selects use of unused blocks in the timeframe based on the scheduling of wireless transmissions by the first wireless station.

9. The method as in claim 8, wherein the second wireless station provides a region of wireless coverage that falls completely within a region of wireless coverage provided by the first wireless station.

10. The method as in claim 7 further comprising:
populating the schedule information to include only transmit information and corresponding unique codes for blocks used by the first wireless station.

11. The method as in claim 1, wherein each of the multiple blocks in the grid are assigned a different unique code, each respective different unique code being a reference specifying a corresponding block of the multiple blocks in the grid.

12. The method as in claim 1, wherein a second block of the grid is assigned the second unique code.

13. The method as in claim 12, wherein the second block assigned the second unique code resides in a second frequency band and the first time slot of the grid.

14. The method as in claim 12, wherein the second block assigned the second unique code resides in a second frequency band and a second time slot of the grid.

15. The method as in claim 1 further comprising:
maintaining map information;
wherein the map information maps the first unique code to the first block of the grid; and
wherein the map information maps the second unique code to a second block of the grid.

16. The method as in claim 1, wherein the first transmitter settings are assigned to wirelessly communicate first data from the first wireless station via the first frequency band and the first time slot.

17. The method as in claim 1, wherein a second block of the grid is assigned the second unique code; and
the method further comprising: assigning the second unique code to the second transmit information associated with the first wireless station, the second unique code indicating a second frequency band and a second time slot in which the second block resides in the grid.

18. A system comprising:
a scheduler operable to:
maintain a grid of multiple blocks for a timeframe in which a first wireless station is scheduled to communicate in a wireless network, a first block of the grid assigned a first unique code;
for a first block of the multiple blocks in the grid, generate first transmit information;
assign the first unique code to the first transmit information, the first unique code indicating a first frequency band and a first time slot in which the first block resides in the grid; and
produce schedule information to include: i) the first unique code and the first transmit information, the first transmit information indicating first wireless transmitter settings of the first wireless station, and ii) a second unique code and second transmit information, the second transmit information indicating second wireless transmitter settings of the first wireless station, the schedule information indicating scheduled transmission of future wireless communications from the first wireless station.

19. The system as in claim 18, wherein the first frequency band is one of multiple frequency bands available in the first time slot of the timeframe.

20. The system as in claim 18, wherein the first frequency band includes multiple wireless channels assigned to the first block.

21. The system as in claim 18, wherein the first transmit information indicates attributes of corresponding wireless communications scheduled for transmission by a first wireless station in the first block.

22. The system as in claim 18 further comprising:
maintaining the grid to include a first set of multiple blocks for the first time slot, each of the multiple blocks in the first set supporting communications in a different frequency band; and
assigning a different unique code to each of the multiple blocks in the first set.

23. The system as in claim 22 further comprising:
producing the grid to be a two-dimensional array including multiple time slots in the timeframe, each of the multiple timeslots including a respective set of blocks, each corresponding block in the respective set allocated multiple wireless channels in which to transmit wireless communications.

24. The system as in claim 18, wherein a second wireless station receiving the schedule information selects use of unused blocks in the timeframe based on the scheduling of transmissions by the first wireless station as specified by the schedule information.

25. The system as in claim 18, wherein the second wireless station provides a region of wireless coverage that falls completely within a region of wireless coverage provided by the first wireless station.

26. The system as in claim 18 further comprising:
populating the schedule information to include only transmit information and corresponding unique codes for blocks used by the first wireless station.

27. Computer-readable storage hardware having instructions stored thereon, the instructions, when carried out by computer processor hardware, cause the computer processor hardware to:
maintain a grid of multiple blocks for a timeframe in which a first wireless station is scheduled to communicate in a wireless network;
for a first block of the multiple blocks in the grid, generate first transmit information;
assign a first unique code to the first transmit information, the first unique code indicating a first frequency band and a first time slot in which the first block resides in the grid; and
produce schedule information to include: i) the first unique code and the first transmit information, the first transmit information indicating first wireless transmitter settings of the first wireless station, and ii) a second unique code and second transmit information, the second transmit information indicating second wireless transmitter settings of the first wireless station, the schedule information indicating scheduled transmission of future wireless communications from the first wireless station.

* * * * *

UNITED STATES PATENT AND TRADEMARK OFFICE
CERTIFICATE OF CORRECTION

PATENT NO. : 11,310,831 B2
APPLICATION NO. : 16/525479
DATED : April 19, 2022
INVENTOR(S) : Khalid

Page 1 of 1

It is certified that error appears in the above-identified patent and that said Letters Patent is hereby corrected as shown below:

In the Claims

Column 15, Line 11, delete "transmission", insert --transmissions--

Signed and Sealed this
Twenty-first Day of June, 2022

Katherine Kelly Vidal
*Director of the United States Patent and Trademark Office*